3,574,518
COLLAGEN MATRIX WATERPROOFING WITH CHROMIUM COMPLEXES CONTAINING RADICALS OF LONG CHAIN HYDROCARBONS AND FLUORINATED HYDROCARBONS AND PRODUCT SO PRODUCED

Peter D. Detomaso, St. Paul, Minn., assignor to Minnesota Mining and Manufacturing Company, St. Paul, Minn.
No Drawing. Continuation-in-part of application Ser. No. 537,685, Mar. 28, 1966. This application Dec. 11, 1968, Ser. No. 783,138
Int. Cl. C14c 9/00
U.S. Cl. 8—94.21         8 Claims

ABSTRACT OF THE DISCLOSURE

A process for improving the dynamic water resistance of a porous collagen fiber matrix treated with a chromium complex capable of imparting water repellency thereto which comprises treating said matrix after tanning and while water wetted with an aqueous float liquor containing a low molecular weight urethane adduct of an organic isocyanate and an alcohol, said adduct having a melting point below about 200° C., a molecular weight below about 10,000, and at least 0.5 urethane groups per 1000 molecular weight of adduct, the weight ratio of said urethane adduct to said chromium complex being from 1/9 to 9/1 and the combined weight of said urethane adduct and said chromium complex being from 1.5 to 5 percent based on the dry weight of said collagen fiber.

---

This application is a continuation-in-part application of U.S. Ser. No. 537,685, filed Mar. 28, 1966 now abandoned.

This invention relates to an improved leather and to the process for its preparation. In another aspect this invention relates to a new composition for treating leather to improve its dynamic water resistance. In still another aspect htis invention relates to a leather having oil and static water resistance in addition to dynamic water resistance.

The treatment of collagen type fiber matrices with chromium complexes of the Werner type has been practiced for some years. In general such chromium complexes have been utilized to impart water repellency, the fluorinated chromium complexes also being of particular value to impart oil and chemical resistance. Higher molecular weight urethane and acrylate polymers have been employed as leather finishes, and various urethane polymers have been utilized to render suede surfaces noncrocking. Although the use of these and other materials may have a beneficial effect on the properties of leather, it has been difficult to obtain the desired balance of properties in a leather subjected to severe usage, as is frequently encountered when leather is flexed repeatedly. Although oil repellency and static water resistance can be provided by known techniques, it has been found that the dynamic water resistance is seriously degraded when the leather is subjected to severe flexing or abrasion.

Accordingly, it is an object of this invention to provide a composition for treating porous collagen type matrices to impart dynamic water resistance.

Still another object of this invention is to provide a stable leather treating concentrate suitable for use in leather treatment to impart dynamic water resistance thereto.

Other objects and advantages of this invention will become apparent from the following disclosure.

In accordance with this invention a porous collagen fiber matrix, preferably a porous leather such as suede or pigskin, is treated after tanning with an aqueous solution of a chromium complex and an aqueous dispersion of a low molecular weight urethane adduct of an organic isocyanate and an alcohol, the weight ratio of said chromium complex to said urethane adduct being from 9/1 to 1/9, preferably about 2/1. The combined weight of chromium complex and urethane adduct in the collagen fiber matrix generally falls within the range of 0.5 to 10% (preferably 1.5 to 5%) of the weight of the dry collagen fiber. To provide particularly outstanding oil repellency in addition to dynamic water resistance, either or both of the chromium complex and the urethane adduct can be fluorinated, and the collagen fiber matrix may be treated to provide at least 0.25 (preferably from 0.8% to 1.5%) of fluorine, based on the dry weight of the collagen fiber.

Any water soluble Werner chromium coordination complex of a carboxylic acid which is capable of rendering leather resistant to water (i.e., static water resistance) may be used in this invention. The hydrocarbon carboxylic acids normally are arylaliphatic or aliphatic carboxylic acids having from 8 to about 20 carbon atoms per molecule. The fluorinated carboxylic acids are characterized by a terminal $CF_3$ group and from 4 to about 18 carbon atoms. Such water soluble complexes (prior to hydrolysis) must be soluble in water at 120° F. to an extent of at least 0.1% by weight. A simple test for evaluating the ability of a chromium complex to impart water repellency or resistance to water may be conducted as follows. A 20 gram sample of chrome tanned suede leather and about 100 grams of water are placed in a glass container, and the pH is adjusted to 3-4 with formic acid. Then an amount of the chromium complex equal to 5% of the dry leather weight is added, usually as a 20 to 40 weight percent solution in isopropyl alcohol and the mixture is tumbled for 45 minutes at 120° F. The leather sample is removed and squeezed to remove excess liquid. After drying completely in a circulating air oven at 150° F. the sample is tested for water repellency by the procedures of ASTM D1913–61T. A spray rating of at least 50 is considered to indicate water repellency or static water resistance.

Suitable hydrocarbon chromium complexes and their preparation are described in U.S. 2,273,040; 2,356,161 (showing chromium complexes of aralkyl carboxylic acids, such as those having a phenyl ring nucleus as a substituent on the alkyl group); 2,524,803 and 2,683,156. Fluorochemical chromium complexes and their preparation are described in French Pat. No. 1,396,008 (e.g., chromium complex of $$CF_3CF(CF_2Cl)C_3F_6CONHCH_2COOH$$ 

and U.S. Pats. Nos. 2,662,835 (showing fluorinated alkyl carboxylic acids in which the alkyl radical can be straight chain alkyl or cycloalkyl); 2,934,450 and 3,088,958 (showing chromium complexes of perfluoroether carboxylic acids). Other useful fluorinated carboxylic acids which may be used to prepare chromium complexes are described in U.S. Pat. No. 3,232,970. It should be appreciated that the various techniques for producing Werner type chromium complexes permit selection of a wide variety of compounds from which the many useful chromium complexes can be prepared.

To obtain the desired dynamic water resistance the collagen fiber matrix must be also treated with a relatively low molecular weight (e.g., molecular weight below 10,000, preferably below 3,000) urethane adduct. The useful urethane adducts have melting points below about 200° C. (usually below 125° C.) and have at least 0.5, preferably from about 0.5 to about 10, urethane groups per 1000 molecular weight of the adduct molecule. They are further characterized by their ability to impart static water resistance to chrome tanned, suede leather (ASTM D1913-61T, at least 50 spray rating) after the urethane adduct is sprayed onto the sample as a 5% solids solution in tetrahydrofuran at a coverage of 25 ml. solution per square foot and the sample is dried at 150° F. until all solvent is removed. Such low molecular weight urethane adducts may be prepared by the known reaction of an organic isocyanate (mono- or poly- isocyanate) and an alcohol (mono- or poly- hydric and may, if desired, contain unreacted isocyanate, hydroxyl or other substituent groups. Either or both of the reactants may be fluorinated if oil repellency is desired in the treated collagen fiber matrix. Fluorocarbon isocyanates, e.g., as shown in U.S. Pats. Nos. 2,617,817 and 2,706,733, may be reacted with various alcohols to form urethane adducts. Fluorocarbon urethane polyadducts may be prepared from organic polyisocyanates and fluorocarbon alcohols, as described in British Pat. No. 999,795. Other useful fluorocarbon alcohols which can be reacted with isocyanates include, for example,

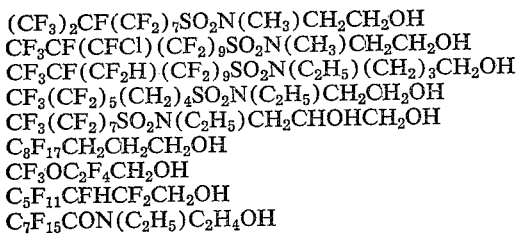

and the fluorinated polyhydric alcohols of U.S. Pats. Nos. 3,094,370 and 3,217,035. Other useful fluorinated urethane adducts are shown in U.S. 2,917,409. By using admixtures of fluorinated and unfluorinated alcohols in the reaction with an organic isocyanate the total fluorine concentration of the resulting adduct can be varied as desired. Illustrative hydrocarbon or unfluorinated urethane adducts are shown in U.S. 2,576,079 (aryl urethane aducts from 2-methyl-2-monoalkylamino-1-propanol); U.S. 2,987,515 (urethane adducts from hydroxyl aliphatic cyclic amidines); and U.S. 3,027,276 (prepolymer of polyisocyanate and a bifunctional reactant having terminal hydroxy groups and being capable of further reaction with hydroxyl or amino groups to produce a cured polyurethane). Although polymeric urethanes falling within the above definition can be used, it has been found preferable to employ non-polymeric adducts for the practice of this invention. The preferred urethane adducts are prepared from an aromatic isocyanate (e.g., toluene diisocyanate) or aliphatic isocyanate (e.g., hexamethylene diisocyanate) and either an arylaliphatic or aliphatic alcohol, the most preferred adducts having from 1 to 4 urethane groups per adduct molecule.

In treating the collagen type fiber matrix with the aforementioned urethane adduct and chromium complex, tanned material (after fat liquoring) which has been water rinsed and is still wet, preferably with approximately an equal weight of water to dry leather, is conveniently used. The wet processing of leather in a tannery or leather finishing house is normally conducted in a tanning drum. A conventional wood tanning drum is approximately 15 feet in diameter and 8 feet in length and contains baffles to tumble the contents while the drum is rotated. During drum rotation the mechanical tumbling of the hides tends to produce an increase in temperature, and it is common practice to heat the drum charge to the desired temperature and thereafter permit the tumbling to proceed without temperature control. The drum is initially charged with from 500 to 1000 pounds of chrome tanned, shaved and split leather stock. Water is added in an amount from about one-half the weight of leather stock ("short float") to a weight about equal to that of the leather stock ("full float"). Retanning chemicals, such as quebracho or neutral formaldehyde based resin synthetic tanning agents or dialdehyde tanning agents, may then be added. After tumbling for a period of time the spent float liquor is removed and the stock is rinsed. Usually the stock is dyed, preferably with an acid or direct dye system, and rinsed. The dyed stock is treated with a fat liquor containing materials of the sulfonated sperm oil type or sulfonated neatsfoot type and is then thoroughly rinsed. Water is added in an amount equal to one-half the leather stock weight and the stock is tumbled at 110° F. for about 10 minutes. The pH of the float liquor is then checked and adjusted to pH 3.0-3.5, if necessary, with concentrated formic acid, and tumbling is continued until the pH remains constant within this range. The chromium complex and urethane adduct, dissolved in a suitable water miscible solvent, preferably tetrahydrofuran, are then added, after which the stock is further tumbled for about 30 to 60 minutes, usually at a temperature in the region of 110° F. until the foam disappears. A more specific test for exhaustion of the chromium complex and urethane adduct, i.e. penetration of all complex and adduct into the leather stock, may be conducted by moistening a piece of filter paper with a sample of the float liquor, drying, and placing a drop of water on the dry paper. If the float liquor is properly exhausted, the water will immediately soak into the paper. The exhausted float liquor is then drained, and the leather stock is removed for processing to finished leather in the normal manner.

Although the chromium complex and urethane adduct may be added separately and successively to the float liquor, it is generally more convenient to prepare a concentrated solution of these components in a mutual solvent, preferably tetrahydrofuran, and to add the desired quantity of this concentrate to the aqueous float of the leather stock.

Water wetted leather fiber matrices which are treated prior to finishing with chromium complexes and the urethane adducts of this invention have outstanding dynamic water resistance as measured by the Maeser test procedure in ASTM D2099-62T, i.e., accept total flexes above 5,000, normally above 15,000. Although the treatment of leather with chromium complexes to impart static water resistance (i.e., water repellency) is a well established procedure and although the use of chromium complexes of fluorinated carboxylic acids can further add oil resistance to the leather, the resistance to water of the leather so treated decreases rapidly as it is flexed repeatedly or abraded. Applicant found that the treatment of leather and other collagen fiber matrices with the low molecular weight urethane adducts of this invention does enhance static water resistance, but the dynamic water resistance was not significantly improved. However, when used in conjunction with chromium complexes the various urethane adducts produced a marked and significant increase in dynamic water resistance. Unlike some leathers having high concentrations of silicone compounds, which also can display good dynamic water resistance, leathers treated in accordance with this invention do not have undesirable oily feel and retain essentially their original moisture vapor transmission characteristics.

Although the mechanism is not fully understood it is believed that the presence of the urethane adduct causes chromium complex removed by abrasion or flexing to form a new bond to the underlying leather substrate. Tests have shown that leather samples treated with both chromium complex and urethane adduct do not show marked loss of dynamic water resistance upon prolonged abrasion of the leather surface, even though the surface areas originally having the highest concentration of these two materials has been abraded away. In some manner the urethane adduct, which is too low in molecular weight to serve as a binder in the normal sense, appears to serve as a carrier to transport chromium complex molecules, as they are abraded or removed from their site of attachment to the collagen fiber, to another collagen fiber for attachment thereto. The urethane group may function as a transfer grouping, since any low molecular weight (and hence mobile or readily flowable) urethane adduct has proven to be useful for the purposes of this invention.

The following examples will illustrate the advantages associated with the procedure of this invention and are not necessarily intended to limit the scope thereof.

EXAMPLE 1

This example illustrates the preparation of a triurethane suitable in the practice of this invention for treating leather in conjunction with a chromium complex.

A predominantly trifunctional aromatic compound, polymethylene polyphenylisocyanate having the structure

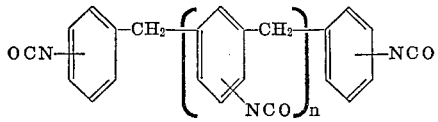

where $n$ has an average value of 1, was charged to a glass-lined jacketed vessel equipped with agitator and for vacuum distillation. 600 parts by weight of dry toluene, 0.3 part of phenyl mercuric acetate catalyst and 400 parts (3 equivalents) of the above-mentioned polymethylene polyphenylisocyanate (about 3 isocyanate groups per molecule, equivalent weight=133) were charged to the vessel. The solution was then heated with stirring to 125° F. and 780 parts (3 mols) of n-octadecyl alcohol were added. Heating and stirring were continued for 2 hours at a temperature of 175° F. Toluene was removed under vacuum at a temperature of 175–200° F. The product was a 3:1 adduct of the alcohol to the polyisocyanate.

Any primary alcohol or mixture of primary alcohols which is soluble in toluene at a temperature of 125° F. can be substituted on an equimolar basis for the octadecyl alcohol used above. Secondary or tertiary alcohols which do not split off water under the conditions of reaction may also be used, but secondary or tertiary hydroxyl groups normally require larger amounts of catalyst, higher reaction temperatures and/or longer reaction times.

EXAMPLE 2

This example illustrates the procedures for preparation of a leather treating concentrate within the scope of this invention.

To a glass-lined vessel fitted with agitator, reflux condenser, equipment for vacuum distillation and a jacket for heating and cooling were charged 6.8 parts by weight of $C_8F_{17}SO_2N(C_2H_5)CH_2COOH$. 50.7 parts by weight of tetrahydrofuran were then added. To the resulting solution 0.22 part of polyoxyethylene derivative of a fatty acid partial ester of sorbitol (sold as "Tween 80" by Atlas Chemical Co.), a non-ionic surfactant, and 8.5 parts of urethane adduct (1 mol toluene diisocyanate, 2 mols $C_8F_{17}SO_2N(C_2H_5)CH_2CH_2OH$) were added. Agitation was continued until the urethane was dissolved in the solution. Then 8.5 parts of chromium hydroxydichloride were added as a 50% aqueous solution. The vessel was agitated for 1 hour at a temperature maintained at about 85–90° F. The contents were then cooled to 70° F. and filtered to remove any remaining solids. The resulting solution was then adjusted to 30% by weight of urethane adduct. This concentrate was added to the aqueous float in a leather treating drum in an amount sufficient to provide the desired concentration per unit weight of leather.

The data appearing in Table I illustrate the improvement in dynamic water resistance obtained with various mixtures of different chromium complexes and different urethane adducts, prepared in a manner similar to Examples 1 and 2.

TABLE I

| Example | Urethane formed from— | Percent urethane on dry leather weight | Chromium complex fromed from— | Percent complex on dry leather weight | Maeser flexes on brushed pigskin |
|---|---|---|---|---|---|
| 3 | | | 3 mol CrOHCl$_2$<br>1 mol C$_8$F$_{17}$SO$_2$N(C$_2$H$_5$)CH$_2$COOH | 3.07 | 1,200 |
| 4 | 1 mol toluene diisocyanate<br>2 mol C$_8$F$_{17}$SO$_2$N(C$_2$H$_5$)CH$_2$CH$_2$OH | 2.0 | | | 200 |
| 5 | 1 mol toluene diisocyanate<br>2 mol C$_8$F$_{17}$SO$_2$N(C$_2$H$_5$)CH$_2$CH$_2$OH | 1.2 | 3 mol CrOHCl$_2$<br>1 mol C$_8$F$_{17}$SO$_2$N(C$_2$H$_5$)CH$_2$COOH | 1.2 | 42,000 |
| 6 | 1 mol toluene diisocyanante<br>1 mol C$_8$F$_{17}$SO$_2$N(C$_2$H$_5$)CH$_2$CH$_2$OH<br>1 mol stearyl alcohol | 1.0 | 4 mol CrOHCl$_2$<br>1 mol C$_8$F$_{17}$SO$_2$N(C$_2$H$_5$)CH$_2$COOH | 2.0 | 50,000+ |
| 7 | 1 mol polymethylene polyphenylisocyanate<br>3 mol stearyl alcohol | 1.0 | 4 mol CrOHCl$_2$<br>1 mol C$_8$F$_{17}$SO$_2$N(C$_2$H$_5$)CH$_2$COOH | 2.0 | 50,000+ |
| 8 | 1 mol polymethylene polyphenylisocyanate<br>2 mol C$_8$F$_{17}$SO$_2$N(C$_2$H$_5$)CH$_2$CH$_2$OH<br>1 mol stearyl alcohol | 1.0 | 4 mol CrOHCl$_2$<br>1 mol C$_8$F$_{17}$SO$_2$N(C$_2$H$_5$)CH$_2$COOH | 2.0 | 50,000+ |
| 9 | 1 mol toluene diisocyanate<br>1 mol C$_8$F$_{17}$SO$_2$N(C$_2$H$_5$)CH$_2$CH$_2$OH<br>1 mol stearyl alcohol | 1.0 | 3 mol CrOHCl$_2$<br>1 mol (CF$_3$)$_2$CF(CF)$_7$CF$_2$CONHCH$_2$COOH | 2.0 | 50,000+ |
| 10 | 1 mol polymethylene polyphenylisocayanate<br>3 mol stearyl alcohol | 1.0 | 4 mol CrOHCl$_2$<br>1 mol stearic acid | 2.0 | 26,000 |
| 11 | 1 mol polymethylene polyphenylisocyanate<br>2 mol C$_8$F$_{17}$SO$_2$N(C$_2$H$_5$)CH$_2$CH$_2$OH<br>1 mol stearyl alcohol | 1.0 | 3 mol CrOHCl$_2$<br>1 mol stearic acid | 2.0 | 50,000+ |
| 12 | 1 mol toluene diisocyanate<br>1 mol C$_8$F$_{17}$SO$_2$N(C$_2$H$_5$)CH$_2$CH$_2$OH<br>1 mol stearyl alcohol | 0.6 | 4 mol CrOHCl$_2$<br>1 mol C$_8$F$_{17}$SO$_2$N(C$_2$H$_5$)CH$_2$COOH | 2.4 | 50,000+ |
| 13 | 1 mol tolyl isocyanate<br>1 mol C$_8$F$_{17}$SO$_2$N(C$_2$H$_5$)CH$_2$CH$_2$OH | 1.0 | 4 mol CrOHCl$_2$<br>1 mol C$_8$F$_{17}$SO$_2$N(C$_2$H$_5$)CH$_2$COOH | 2.0 | 50,000+ |
| 14 | 1 mol polymethylene polyphenylisocyanate<br>1.5 mol C$_8$F$_{17}$SO$_2$N(C$_2$H$_5$)CH$_2$CHOHCH$_2$OH | 1.0 | 4 mol CrOHCl$_2$<br>1 mol C$_8$F$_{17}$SO$_3$N(C$_2$H$_5$)CH$_2$COOH | 2.0 | 50,000+ |
| 15 | 1 mol toluene diisocyanate<br>1 mol C$_8$F$_{17}$SO$_2$N(C$_2$H$_5$)CH$_2$CH$_2$OH<br>1 mol stearyl alcohol | 1.0 | 4 mol CrOHCl$_2$<br>1 mol C$_8$F$_{17}$SO$_2$N(C$_2$H$_5$)CH$_2$COOH | 2.0 | 50,000+ |

EXAMPLE 16

This example illustrates the preparation of a particularly preferred urethane adduct.

To a glass-lined vessel equipped with a stirrer and heating jacket is charged:

| | Parts by weight |
|---|---|
| CH$_3$CCl$_3$ | 795 |
| C$_8$F$_{17}$SO$_2$N(C$_2$H$_5$)CH$_2$CH$_2$OH | 883 |
| Phenyl mercuric acetate | 0.4 |
| Toluene diisocyanate | 269 |

The agitator is started and the solution is heated to 168° F. After stirring at this temperature for a period of 1 hour 455 parts by weight of octadecyl alcohol and 7.6 parts by weight of phenyl mercuric acetate is added to the mixture. The mixture is then stirred for 2 hours with the temperature maintained at 168° F. After the contents are cooled to 70° F., the solution is normally placed in pans in a vacuum oven or a circulating air oven at about 200° F. until most of the solvent is removed. The urethane adduct involves the addition of 1 mol of the fluorinated alcohol and 1 mol of octadecyl alcohol to 1 mol of toluene diisocyanate. By varying the ratio of the two alcohols the same procedure may be used to produce an adduct with from 2 mols of fluorinated alcohol per mol of toluene diisocyanate to 2 mols of the hydrocarbon alcohol per mol of toluene diisocyanate. Any solvent which boils above about 170° F. at atmospheric pressure, which is free of active hydrogen and which will dissolve both the alcohol and the isocyanate may be used, including such solvents as methyl ethyl ketone, dioxane, tetrahydrofuran, xylene, etc.

EXAMPLE 17

This sample illustrates the relative effect of treating a brushed pigskin sample with the compositions of this invention.

Four samples of brushed pigskin which were chrome tanned, retanned with a neutral synthetic tanning agent, colored with acid dye and fat liquored were treated at 120° F. from a short aqueous float in which the pH was adjusted to 3.0–3.5 with formic acid prior to treatment. Weights were based on dry leather. Sample 1 was treated with 3% chromium complex of 4 mols $CrOHCl_2$ and 1 mol of $C_8F_{17}SO_2N(C_2H_5)CH_2COOH$. Sample 2 was treated with 1.2% chromium complex of 4 mols $CrOHCl_2$ and 1 mol of $C_8F_{17}SO_2N(C_2H_5)CH_2COOH$ and 1.6% urethane adduct (2 mols of $$C_8F_{17}SO_2N(C_2H_5)CH_2CH_2OH$$

and 1 mol of toluene diisocyanate). Sample 3 was treated with 2% urethane adduct (2 mols of $$C_8F_{17}SO_2N(C_2H_5)CH_2CH_2OH$$

and 1 mol toluene diisocyanate). Sample 4 was treated with 1.6% of a chromium complex of 0.9 mol $$C_8F_{17}SO_2N(C_2H_5)CH_2COOH$$

0.1 mol of $C_{17}H_{35}COOH$ and 4 mols $CrOHCl_2$ and 1.6% of urethane adducts (2 mols of $$C_8F_{17}SO_2N(C_2H_5)CH_2CH_2OH$$

and 1 mol toluene diisocyanate). The results are shown in Table II. In the abrasion procedure the sample was first abraded with fine sandpaper for 20 cycles and then brushed for 5 cycles with a wire brush. Static water resistance and dynamic water resistance test procedures were taken from ASTM D1913–61T and ASTM D2099–62T, respectively.

What is claimed is:
1. A process for improving the dynamic water resistance of a porous collagen fiber matrix which comprises treating said martix after tanning and while water wetted with (a) an aqueous float liquor containing a water soluble chromium complex of (1) a phenylaliphatic carboxylic acid having a straight chain hydrocarbon radical with from 1 to about 13 carbon atoms, (2) an aliphatic carboxylic acid having a straight chain hydrocarbon radical with from 7 to about 19 carbon atoms, or (3) a fluorinated alkyl or cycloalkyl carboxylic acid having from 4 to about 18 carbon atoms and having a terminal $CF_3$ group, said complex being capable of imparting water repellency to said matrix, and (b) an aqueous float liquor containing a low molecular weight urethane adduct of an organic isocyanate and an alcohol, said adduct, having a melting point below about 200° C., a molecular weight below about 10,000, and at least 0.5 urethane group per 1000 molecular weight of adduct, the weight ratio of said urethane adduct to said chromium complex being from 1/9 to 9/1 and the combined weight of said urethane adduct and said chromium complex being from 1.5 to 5 percent based on the dry weight of said collagen fiber.

2. The process of claim 1 in which said urethane adduct of an adduct of toluene diisocyanate and an alcohol.

3. The process of claim 1 in which said urethane adduct is an adduct of polymethylene polyphenylisocyanate and an alcohol.

4. The process of claim 1 in which said urethane adduct is an adduct of an organic polyisocyanate and a fluorinated alcohol.

5. The process of claim 1 in which said collagen fiber matrix is natural leather.

6. A porous collagen fiber matrix prepared by the process ot claim 1 and having a dynamic water resistance of at least 5,000 Maeser flexes.

7. The collagen fiber matrix of claim 6 in which said collagen fiber matrix is natural leather hide.

8. The collagen fiber matrix of claim 6 in which the weight ratio of said chromium complex to said urethane adduct is about 2/1.

TABLE II

| Reference | Water resistance | | | Oil resistance | | Chemical resistance | | | |
|---|---|---|---|---|---|---|---|---|---|
| | Static water | | Dynamic water [1] | Surface repellency | | Degrees curl to HCl | | Effect of Hot NaOH | |
| | Before abrasion | After abrasion | | Before abrasion | After abrasion | Before abrasion | After abrasion | Before abrasion | After abrasion |
| 1 (control) | 80 | 70 | 1,200 | 80 | 50— | 0 | 0 | No effect | No effect. |
| 2 | 70 | 80 | 18,000+ | 60 | 50— | 0 | 0 | do | Do. |
| 3 | 50 | 50 | 200 | 0 | 0 | 180 | 180 | Burn | Burn. |
| 4 | 80 | 85 | 42,000+ | 80 | 70 | 0 | 0 | No effect | No effect. |

[1] Maeser flexes after abrasion.

References Cited

UNITED STATES PATENTS 2,662,835  12/1953  Reid _____ 117—121
2,884,336  5/1959   Loshaek et al. _____ 117—11
3,094,370  6/1963   Nicoll _____ 8—94.21

DONALD LEVY, Primary Examiner

U.S. Cl. X.R.

8—94.13, 94.22; 117—142

UNITED STATES PATENT OFFICE
CERTIFICATE OF CORRECTION

Patent No. 3,574,518　　　　　　　　Dated April 13, 1971

Inventor(s) Peter D. DeTomaso

It is certified that error appears in the above-identified patent and that said Letters Patent are hereby corrected as shown below:

Column 8, Claim 1, line 4, "martix" should read --matrix--. Column 8, Claim 2, line 26, "of an adduct" should read --is an adduct--.

Signed and sealed this 13th day of July 1971.

(SEAL)
Attest:

EDWARD M. FLETCHER, JR.　　　　　　　WILLIAM E. SCHUYLER,
Attesting Officer　　　　　　　　　　Commissioner of Patent